Oct. 30, 1956 H. D. GAITE 2,768,826
STEP-BY-STEP LINEAR DRIVE
Filed Nov. 15, 1951 6 Sheets-Sheet 1

Inventor
Harold Dodimead Gaite
by Dezsoe Steinherz
Attorney

Oct. 30, 1956  H. D. GAITE  2,768,826
STEP-BY-STEP LINEAR DRIVE
Filed Nov. 15, 1951  6 Sheets-Sheet 4

Inventor
Harold Dodimead Gaite
by Dezsoe Steinherz
Attorney

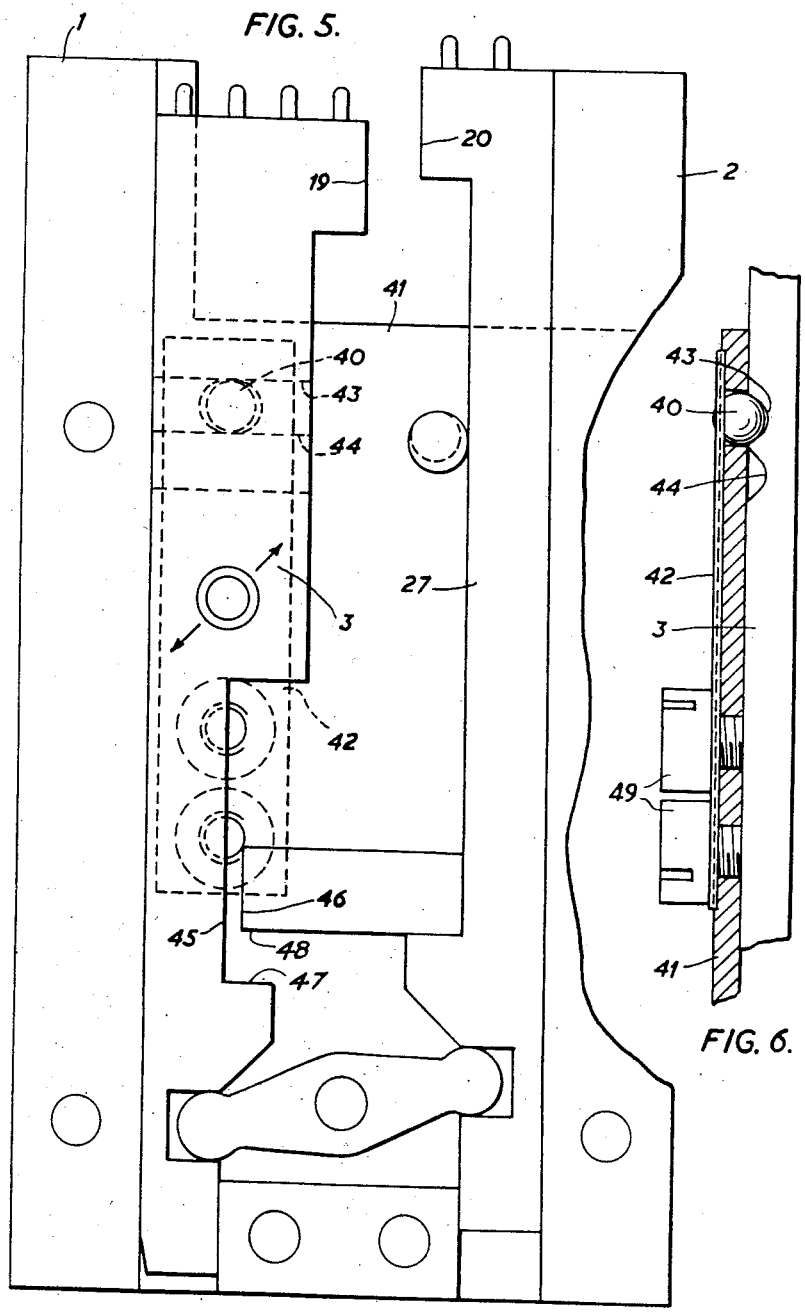

Oct. 30, 1956  H. D. GAITE  2,768,826
STEP-BY-STEP LINEAR DRIVE
Filed Nov. 15, 1951  6 Sheets-Sheet 6

Harold Dodimead Gaite
by Jesse Steinberg
Attorney

United States Patent Office 2,768,826
Patented Oct. 30, 1956

2,768,826

STEP-BY-STEP LINEAR DRIVE

Harold D. Gaite, Taplow, England, assignor to British Telecommunications Research Limited, Taplow, England, a British company Application November 15, 1951, Serial No. 256,476

Claims priority, application Great Britain November 22, 1950

7 Claims. (Cl. 271—2.5)

The present invention relates to an arrangement for producing a step-by-step linear drive having particular application to mechanisms used in the telecommunication art although it is to be understood that it is not limited thereto.

A number of arrangements are known for producing a linear drive and usually these known arrangements include a ratchet wheel, a detent wheel and a drive wheel.

The object of the present invention is to provide a linear drive arrangement operating in a step-by-step manner which is simpler in operation and cheaper in manufacture than the known types.

According to the invention, one end of a drive member is caused to move over a rectangular path in response to the application thereto of a reciprocating driving force by the provision of mechanical restraining means which enable the end of the drive member to move in the direction of its length and breadth for each stroke of said reciprocating driving force.

Preferably the drive member is acted upon by a reciprocating driving force acting at an angle thereto and the mechanical constraining means are so arranged that the drive member is adapted to be acted upon in turn by components of the driving force in the direction of its length and breadth.

In one form of the invention the constraining members consist of abutments and pawls which cooperate with abutment surfaces on the drive member while in a second form of the invention the pawls are replaced by a spring-loaded ball preferably in one of the guide members which engages with one or other of two slots in the drive member. It will of course be understood that the positions of the ball and the slots may be reversed.

The invention will be better understood from the following description of two forms of the invention taken in conjunction with the accompanying drawings in which, Figs. 1–4 show the drive member of the first embodiment in various positions during the rectangular movement and Figs. 5 and 6 show front and side elevations respectively of the second embodiment.

Figure 7:
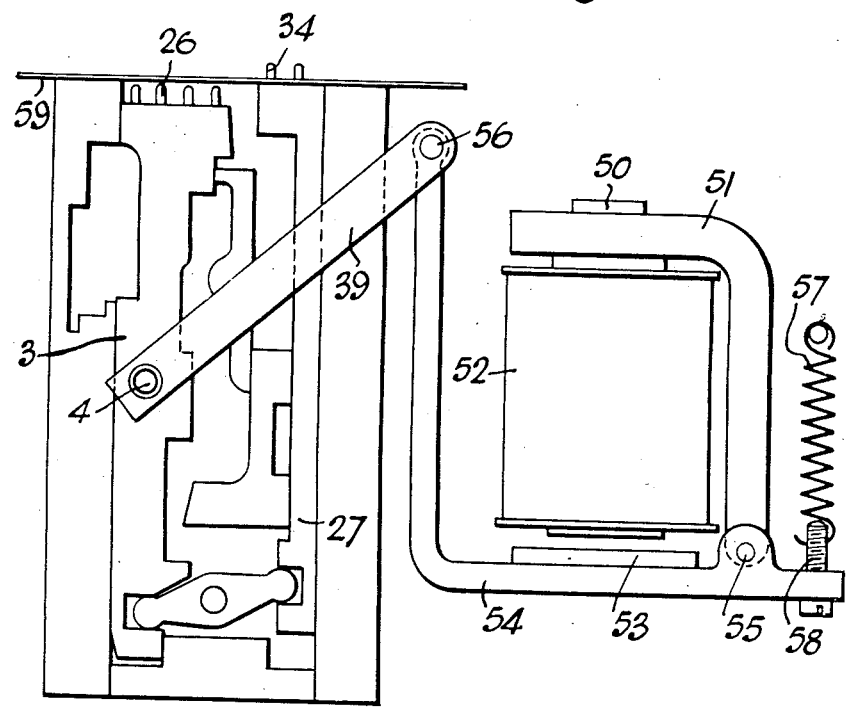

Fig. 7 shows on a smaller scale one possible method of operating the linear drive mechanism by means of an electromagnet to form a unit suitable for use in a tape reader as employed in automatic transmitter heads for tele-printer working.

Considering first the general arrangement of Fig. 7, the electromagnet comprises essentially a straight core 50 mounted on an L-shaped heelpiece 51 and carrying a coil 52. The magnet is provided with an armature 53 secured to a cranked extension 54 which is pivoted to the heelpiece at 55. Pivoted to the extremity of the cranked member 54 at the point 56 is the driving link 39 by means of which a reciprocating force is applied at the point 4 to the drive member 3. It will be appreciated that when the magnet is suitably energised, the armature is attracted and the crank 54 acts on the link 39 tending to move it in the direction of its length and hence to move the drive member upwards and to the right. The sequence of operations which take place at this time will be described in more detail subsequently in connection with Figs. 1–4.

When the magnet is de-energised, the restoring spring 57 which is secured to the cranked lever 54 by means of the adjusting screw 58, restores the armature to its normal position, whereupon link 39 acts on drive member 3 in the opposite direction, namely downwards and to the left.

The tape is indicated at 59 and it will be appreciated that this is of the kind normally employed in machine telegraphy having a row of feed holes which are engaged by the pins 26 and 34 on the drive member 3 and the holding member 27 respectively and also provided with selectively punched holes carrying the message it is desired to transmit.

Figure 1:
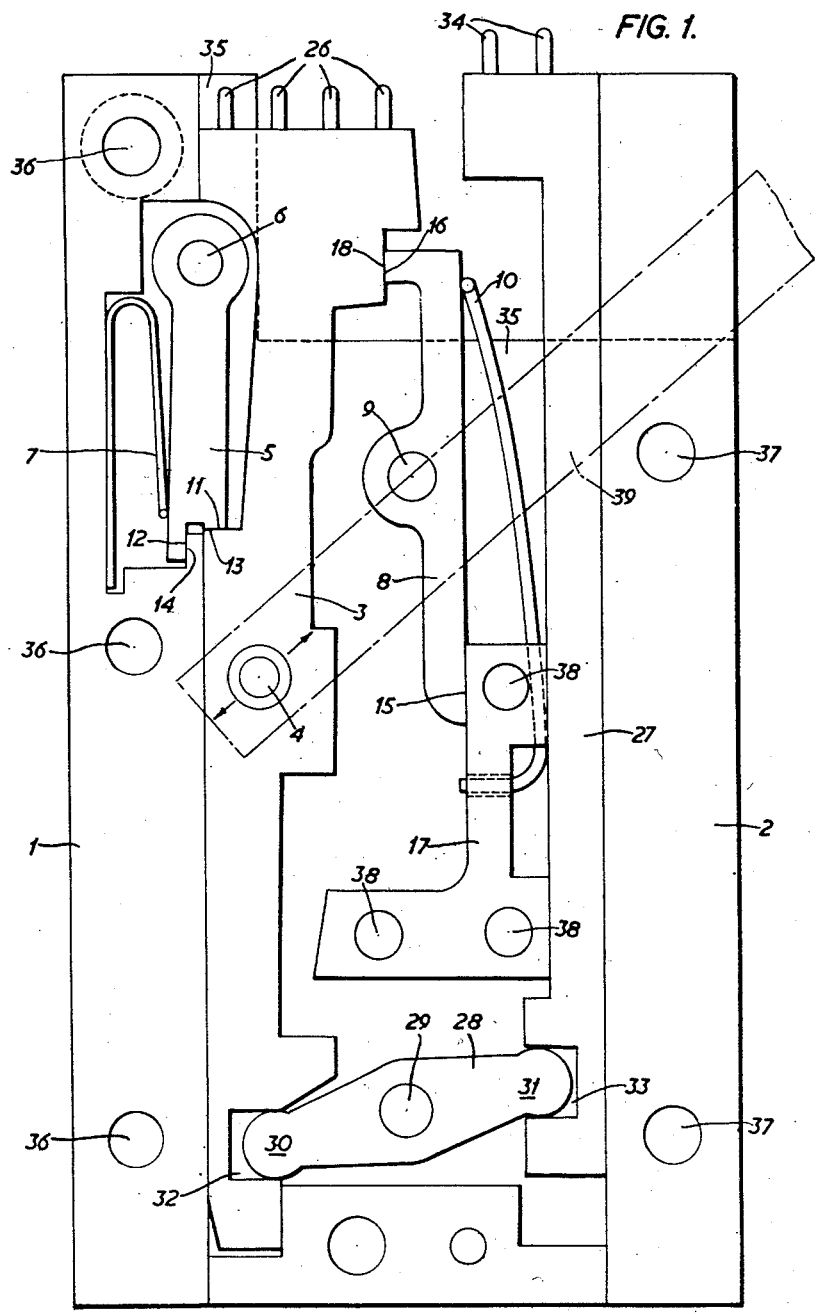

Referring now to Fig. 1, the guide plates are indicated by 1 and 2 and the drive member by 3. A member 39 is secured to the drive member at 4, and is acted upon by a reciprocating driving force in the direction of its length, as indicated by the arrows adjacent 4. A first pawl 5 is pivoted at 6 to the guide plate 1 and is urged in an anticlockwise direction by the spring 7. A second pawl 8 is pivoted at 9 in fixed relation to the guide plate 2 and is urged in an anticlockwise direction by the spring 10. The pawl 5 is provided with two abutment surfaces 11 and 12 of which one, 11, engages with the abutment surface 13 on the drive member 3 while the second, 12, engages with the abutment surface 14 formed on the guide plate 1. The pawl 8 is likewise provided with two abutment surfaces 15 and 16 of which one, 15, engages with the abutment member 17 which is fixed in relation to the guide plates while the other, 16 engages with an abutment surface 18 on the drive member.

Figure 2:
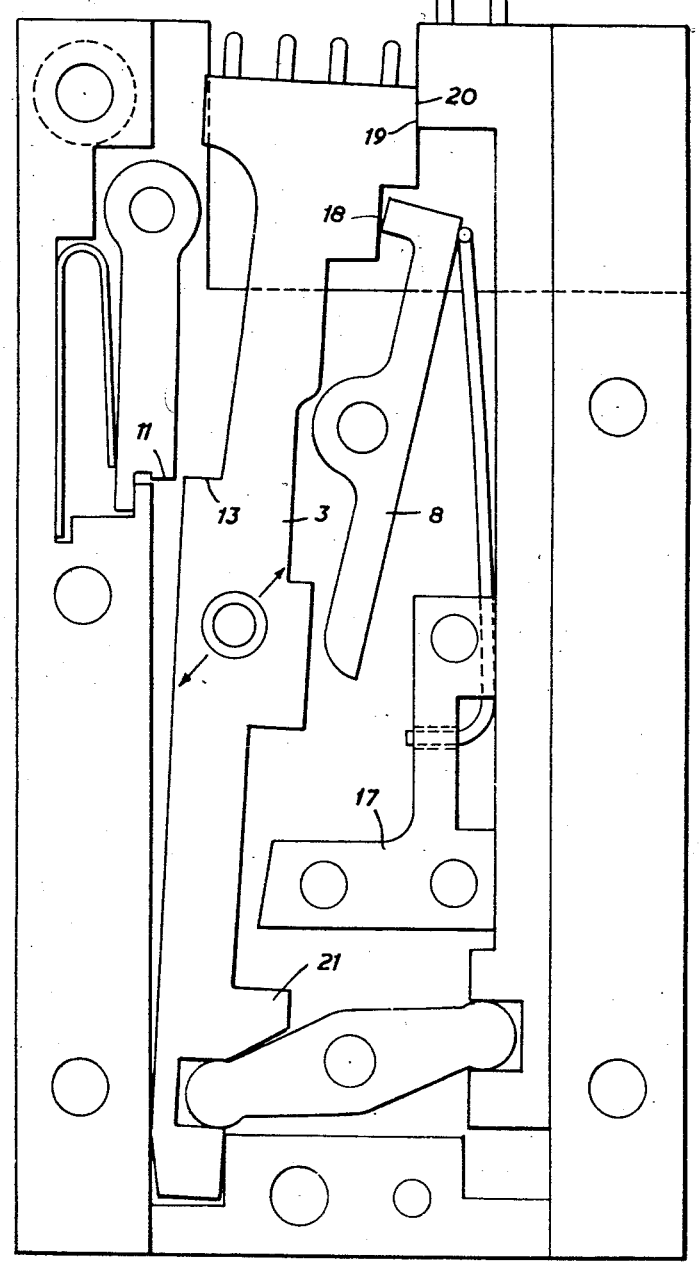
Figure 3:
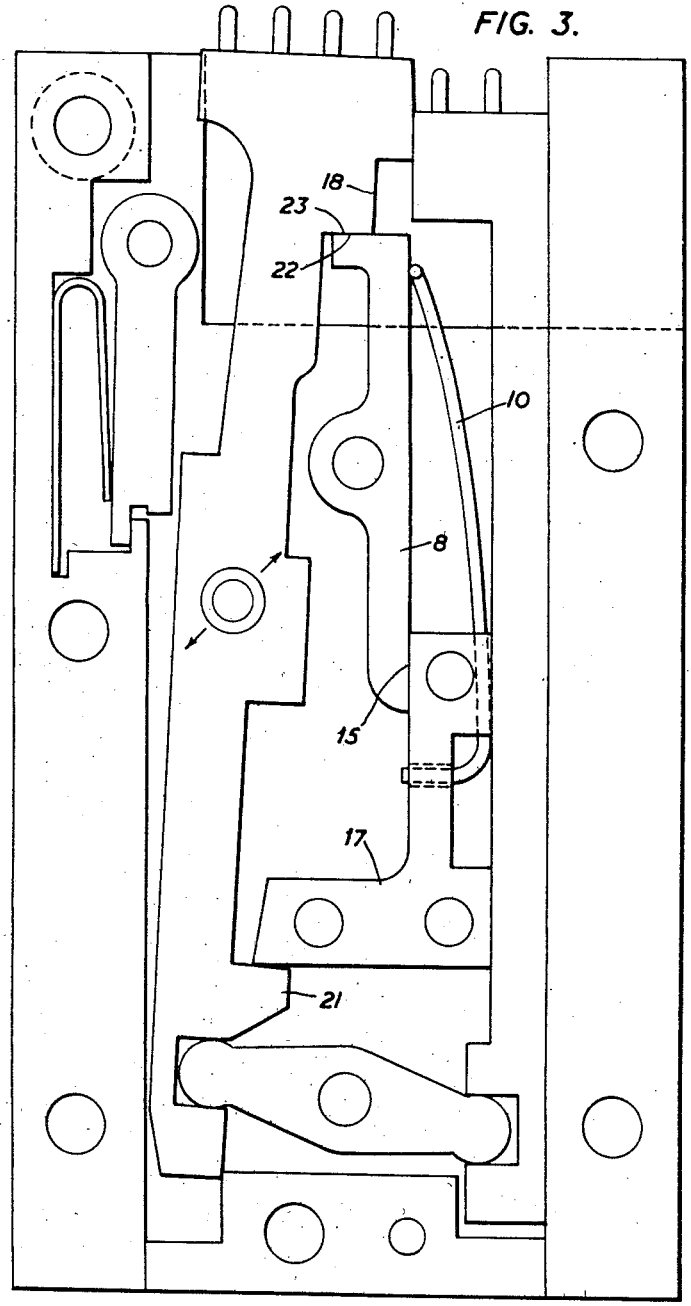

Starting with the parts in the position shown in Fig. 1 the member 39 acts on the drive member 3 in an upward direction towards the right. This driving force may be resolved into two components one acting along the length and one along the breadth of the drive member. The component along the length of the drive member is unable to cause upward movement of the drive member because of the engagement between the two surfaces 11 and 13. There is however no constraint against the component of the driving force in the direction of the breadth of the drive member and hence the drive member moves sideways until the abutment surface 13 moves out of engagement with the cooperating surface 11 on the pawl 5. This movement is effected against the tension of the spring 10 and the pawl 8 pivots in a clockwise direction. The instantaneous position of the parts as the abutment surface 13 slides off the abutment surface 11 is shown in Fig. 2 and it will be noted that the abutment surface 19 on the drive member 3 now engages with the abutment surface 20 on the member 27 which engages the guide plate 2, so that further movement in the sideways direction is prevented. However the drive member 3 is no longer prevented from moving in an upward direction and consequently the drive member moves in this direction, the surface 19 sliding on the surface 20 while the pawl 8 slides along the surface 18. This movement continues until the abutment 21 on the drive member engages with the fixed abutment 17 as shown in Fig. 3. In approaching this position, the surface 18 on the drive member 3 moves above the pawl which is then urged by the spring 10 in an anticlockwise direction to take up the position shown in Fig. 3 in which the top surface 22 of the pawl is under the abutment surface 23 on the drive member, and the surface 15 of the pawl engages with the fixed abutment 17.

Figure 4:
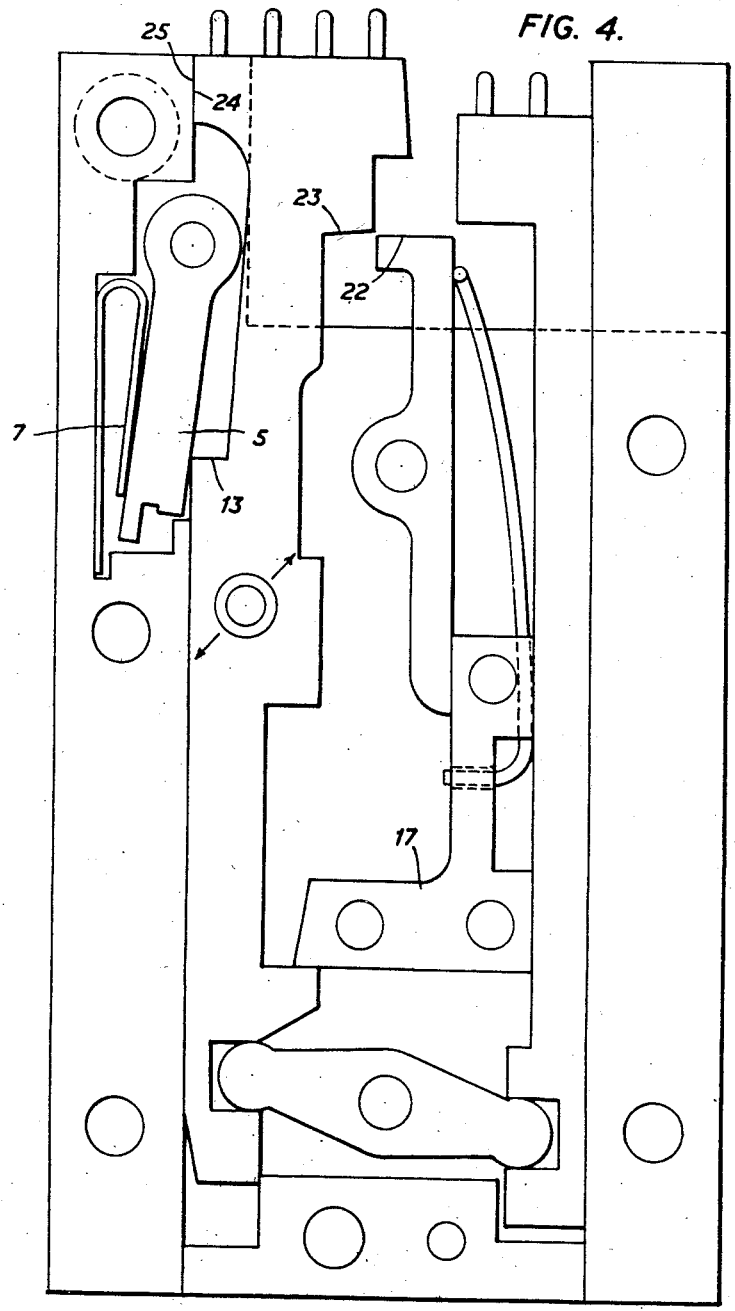

As the parts reach the position shown in Fig. 3, the member 39 begins to move in the opposite direction i. e. in a downward direction towards the left. The vertical component of the applied force is without effect at this stage due to the engagement between the surfaces 22 and 23. The horizontal component is however able to act on the drive member and consequently the latter moves sideways to the left until the surface 23 clears the surface 22 as shown in Fig. 4 and the surface 24 on the drive member engages with the surface 25 on the guide plate 1. During this movement the edge of the abutment surface 13 on the drive member engages the pawl 7 causing this to move in a clockwise direction against the action of the spring 7 as shown in Fig. 4. The vertical component of the driving force is now effective on the drive member to move the latter downwardly to take up the position shown in Fig. 1 in which the abutment surface 11 on the pawl 5 again engages with the abutment surface 13 on the drive member, and the abutment surface 16 on the pawl 8 again engages with the abutment surface 18 on the drive member.

It will be noted that Figs. 2, 3 and 4 do not show the member 39 this member having been omitted in order not to over-complicate the drawing. It should also be explained that the mechanism is contained within front and rear walls of which the rear wall 35 only is visible and is referenced only in Fig. 1. The guide plates 1 and 2 are secured between these walls by means of suitable securing means 36 and 37 for instance, pins or rivets and the same applies to the fixed abutment 17, the securing means being shown at 38.

The above described arrangement has many applications in the telecommunication field and one particular application is to be the tape drive for step-by-step tape readers used in automatic transmitting heads for teleprinter working. In this case the driving force is exerted by an electromagnet having a hinged, spring-loaded armature which is connected with an external pin-jointed link to the member 3. Further the head of the drive member is provided with pins 26 adapted to engage in holes in the tape so that the tape is advanced one step during the movement of the drive member from the position shown in Fig. 3 to that shown in Fig. 4.

In order to retain a positive control over the tape at all times, a retaining member is provided with pins for engaging the tape, the movement of said member being coordinated with that of the drive member so that the pins on the further member engage the paper tape while the pins on the drive member do not and vice versa.

This retaining member is indicated by 27 in Fig. 1 and it will be seen that it is controlled by the movement of the drive member 3 by the link 28, pivoted at 29 in fixed relation to the guide plates. The link 28 has ball-shaped ends 30 and 31 which engage in recesses 32 and 33 respectively in the two members 3 and 27. The top surface of the member 27 is provided with pins 34.

It will be seen from the drawings that the member 27 remains in position during sideways movement of the drive member 3 and moves oppositely to drive member 3 during the up and down movement thereof.

In an alternative form of the embodiment shown in Figs. 1–4, the fixed abutment 17 is dispensed with, the functions of the fixed abutment being effected first by limiting the extent of movement of the reciprocating member 39 and second by pivoting the link 28 to the driving member 3 and retaining member 27 and limiting the movement of the driving member in an inward direction by causing an extension of the pivot point in the driving member to work in a vertical slot in the rear wall 35.

The second embodiment of the invention is shown in Figs. 5 and 6 in which the parts which are the same as those of Figs. 1–4 are given the same references. In this embodiment the two pawls are replaced by a ball 40 located in a hole in a bounding wall 41, the ball being maintained against the drive member 3 by means of the spring 42 which is secured at one end to the outside of the bounding wall by the screws 49. The drive member 3 is provided with two transverse recesses or grooves 43 and 44 one of which is engaged by the ball. As described previously, the first movement of the drive member will be in a sideways direction towards the right until the surfaces 19 and 20 engage, the pressure of the spring being sufficient to prevent upward movement of the drive member. During this movement, the drive member tilts slightly owing to engagement between surfaces 45 and 46. When surfaces 19 and 20 engage further sideways movement is prevented and the upward component of the driving force causes the ball to be pressed to the left (Fig. 6) thereby allowing upward movement of the drive member until surfaces 47 and 48 engage. At this time the ball slips into the lower groove 44 and the driving force reverses its direction. The first part of the return movement is in a sideways direction towards the right, the ball remaining in the lower groove 44 while during the final movement the drive member moves in a downward direction, the ball slipping from the lower to the upper groove.

It will be seen that this embodiment considerably simplifies the shape of the guide plates and of the drive member so that manufacturing costs are reduced without any sacrifice to the efficiency of the device.

A further advantage in the use of the device in a tape reader is that the sensing pins or peckers may be so mounted that they are between the first and the last of the driving pins. The paper is thus positively driven before the first series of perforations in the tape and after the last series thus ensuring that every series of holes is read and the appropriate character transmitted.

Preferably an extension is provided on each side of the member 27 and the pivoted pecker arms are arranged beneath such extensions. With this arrangement the peckers are withdrawn from the tape as the pins 34 are withdrawn. There is thus no wear on the peckers due to rubbing on the paper tape so that the peckers may be made non-adjustable. This represents a further marked saving in first cost and maintenance with the operational advantage that less contact bounce is experienced so that the speed of operation may be increased.

This simple design of the drive mechanism may be used to construct a tape reader which is extremely small and light without sacrificing strength, accessibility or expectation of life while the power consumption remains normal.

It will be seen that with the above two constructions, the sequence of operations may be stated to be "back," "up," "forward" and "down." It will be appreciated, however, that other sequences of operation may be obtained. For instance by turning the abutment surfaces 11, 13 and 16, 18 of Figs. 1–4 through 90 degrees or by making the grooves 43 of Fig. 5 vertical and in each case by altering the direction of application of the driving force through 90 degrees, the sequence "back," "down," "forward" and "up" may be obtained.

I claim:

1. A step-by-step linear drive mechanism for causing a drive member to perform a rectangular movement comprising a movable support, a group of pins rigidly mounted on said support and constituting a drive member, means for applying a reciprocating driving force to said support at a single point in a substantially constant direction oblique to a line extending between the point of application of said driving force and said drive member and constraining means for causing movement of said drive member to take place successively at right angles to the line joining said point of application to said drive member and parallel thereto in response to each application of said driving force.

2. A step-by-step linear drive mechanism for producing a rectangular movement comprising an elongated drive member, means for applying a reciprocating driving force to said drive member at a single point intermediate its ends and in a substantially constant direction oblique to its length, and constraining means for causing movement of the end of said drive member to take place successively at right angles to its length and in the direction of its length in response to each application of said driving force.

3. A step-by-step linear drive mechanism for producing a rectangular movement comprising an elongated drive member means for applying a reciprocating driving force to said drive member at a point intermediate its ends and in a direction oblique to its length, a first resiliently-mounted pawl for preventing movement of the drive member in the direction of its length away from its normal position but offering no resistance to movement in the opposite direction, a second resiliently-mounted pawl for preventing movement of the drive member in the direction of its length back to its normal position but offering no resistance to movement in the opposite direction and two fixed abutments for limiting the movement of one end of the drive member in a direction at right angles to its length, the parts being so located that when the drive member has moved to engage either of said abutments it is clear of the restraining effect of the corresponding pawl.

4. A step-by-step linear drive mechanism comprising an elongated drive member, means for applying a reciprocating driving force to said drive member at a point intermediate its ends and in a direction oblique to its length, a pair of grooves in said drive member extending at right angles to its length, a spring-pressed ball arranged to seat in one or other of said grooves when said drive member is at the opposite limits of its movement in the direction of its length, and two fixed abutments for limiting the movement of one end of said drive member in a direction at right angles to its length whereby the said end of said drive member performs a rectangular movement in response to the application of said driving force.

5. A step-by-step linear drive mechanism for producing a rectangular movement comprising an elongated drive member, an electromagnet, an armature for said electromagnet, a restoring spring for said armature, a link connecting said armature with said drive member at a point intermediate its ends and at an angle to its length whereby on the energization of said electromagnet said link applies a driving force in the direction of its length to said drive member in a direction oblique to its length, first constraining means for causing movement of the end of said drive member to take place successively at right angles to its length and in the direction of its length and second constraining means for causing movement of the end of said drive member to take place successively at right angles to its length and in the direction of its length when a driving force is applied to said drive member in the opposite direction when said link is acted on by said restoring spring on the de-energisation of said electromagnet.

6. A tape reading machine employing a linear drive mechanism as claimed in claim 2 in which the end of the drive member which performs a rectangular movement is provided with pins for engaging in suitable holes in a punched tape.

7. A tape reading machine as claimed in claim 6 comprising in addition a retaining member also provided with pins for engaging in said holes in said punched tape and a lever system connecting said drive member and said retaining member whereby when said drive member moves in the direction of its length said retaining member moves in the opposite direction.

References Cited in the file of this patent

UNITED STATES PATENTS

| | | |
|---|---|---|
| 777,974 | Perret | Dec. 20, 1904 |
| 1,163,916 | Harter | Dec. 14, 1915 |
| 1,327,520 | Browning | Jan. 6, 1920 |
| 1,798,072 | Debrie | Mar. 24, 1931 |
| 2,054,837 | Sherman | Sept. 22, 1936 |
| 2,141,037 | Franklin | Dec. 20, 1938 |
| 2,280,737 | Alburger | Apr. 21, 1942 |
| 2,419,759 | Briskin et al. | Apr. 29, 1947 |
| 2,601,181 | Thevenaz | June 17, 1952 |

FOREIGN PATENTS

| | | |
|---|---|---|
| 627,362 | Germany | Mar. 13, 1936 |